United States Patent
Chen et al.

(10) Patent No.: US 9,501,914 B1
(45) Date of Patent: Nov. 22, 2016

(54) SURVEILLANCE METHOD

(71) Applicant: Climax Technology Co., LTD., Taipei (TW)

(72) Inventors: Yi-Kai Chen, Taipei (TW); Ying-Chun Lee, Taipei (TW)

(73) Assignee: Climax Technology Co., Ltd., Taipei (TW)

( * ) Notice: Subject to any disclaimer, the term of this patent is extended or adjusted under 35 U.S.C. 154(b) by 0 days.

(21) Appl. No.: 14/811,182

(22) Filed: Jul. 28, 2015

(30) Foreign Application Priority Data

Jun. 9, 2015 (TW) .............................. 104118664 A (51) Int. Cl.
*H04N 7/18* (2006.01)
*H04N 7/20* (2006.01)
*H04N 5/77* (2006.01)
*G08B 13/196* (2006.01)
*H04N 5/33* (2006.01)
*H04N 5/92* (2006.01)
*H04N 5/93* (2006.01)

(52) U.S. Cl.
CPC ..... *G08B 13/1966* (2013.01); *G08B 13/19617* (2013.01); *G08B 13/19636* (2013.01); *G08B 13/19669* (2013.01); *G08B 13/19695* (2013.01); *H04N 5/33* (2013.01)

(58) Field of Classification Search
CPC ............ H04N 7/18; H04N 7/20; H04N 5/77; H04N 5/92; H04N 5/93
USPC ......... 386/228, 326, 353; 725/81, 82, 73, 74
See application file for complete search history.

(56) References Cited

U.S. PATENT DOCUMENTS

| | | | |
|---|---|---|---|
| 7,945,688 B1 * | 5/2011 | Lango ................... | H04L 65/605 709/203 |
| 2005/0188407 A1 * | 8/2005 | van Beek ........... | H04N 21/2365 725/81 |
| 2012/0260145 A1 * | 10/2012 | Yang ................. | H03M 13/1515 714/758 |
| 2013/0315235 A1 * | 11/2013 | Foo ........................ | H04L 67/06 370/389 |

* cited by examiner

*Primary Examiner* — Daquan Zhao
(74) *Attorney, Agent, or Firm* — Donald E. Stout; Stout, Uxa & Buyan, LLP (57) ABSTRACT

A surveillance method includes capturing media by a media capturing device of a sensor device according to a trigger event; the sensor device sending a media ready notice to a host; the host sending a media size request to the sensor device to request a size of the captured media; the sensor device sending a media size response to the host to notify the host of the size of the captured media; the host determining a number of packets to be transmitted in burst mode according to the notified size of the captured media, followed by sending a corresponding burst mode packets transmit request to the sensor device; and the sensor device transmitting the determined number of packets in a continuous manner to the host according to the burst mode packets transmit request.

18 Claims, 7 Drawing Sheets

SURVEILLANCE METHOD

CROSS-REFERENCE TO RELATED APPLICATIONS

The entire contents of Taiwan Patent Application No. 104118664, filed on Jun. 9, 2015, from which this application claims priority, are expressly incorporated herein by reference.

BACKGROUND OF THE INVENTION

1. Field of the Invention

The present invention generally relates to a surveillance method, and more particularly to a surveillance method based on a low power wireless sensor network.

2. Description of Related Art

A video surveillance system uses cameras at major sites to record image information, which is then transmitted via the Internet and is centrally monitored. The video surveillance system takes the place of manpower surveillance, and increases surveillance efficiency.

According to one characteristic of conventional video surveillance systems, the cameras that record image information are powered by mains electricity, and are in active state most of the time. Power wiring complicates the task of setting the cameras, and makes it inflexible to relocate the cameras.

According to another characteristic of the conventional video surveillance systems, one packet is transmitted in each communication session, such that time is wasted and energy efficiency cannot be raised.

A scheme is proposed to modify media access control (MAC) sublayer in order to transmit plural packets in each communication session. However, devices made by different manufacturers may probably be incompatible with each other for communication.

A need has thus arisen to propose a novel surveillance structure in order to overcome disadvantages encountered in the conventional video surveillance systems.

SUMMARY OF THE INVENTION

In view of the foregoing, it is an object of the embodiment of the present invention to provide a surveillance method, which is directed to a low power wireless sensor network, powered by batteries, thereby eliminating complexity of power wiring and facilitating relocation. Furthermore, plural packets may be transmitted in burst mode, thereby enhancing energy efficiency without sacrificing compatibility among devices.

According to one embodiment, a media capturing device of a sensor device captures media according to a trigger event; and the sensor device sends a media ready notice to a host after capturing the media. The host sends a media size request to the sensor device to request a size of the captured media; and the sensor device sends a media size response to the host to notify the host of the size of the captured media. The host determines a number of packets to be transmitted in burst mode according to the notified size of the captured media, followed by sending a corresponding burst mode packets transmit request to the sensor device; and the sensor device transmits the determined number of packets in a continuous manner to the host according to the burst mode packets transmit request.

BRIEF DESCRIPTION OF THE DRAWINGS

FIG. 3 (including FIG. 3a and FIG. 3b) shows a flow diagram illustrated of a surveillance method according to a first embodiment of the present invention;

FIG. 5 (including FIG. 5a and FIG. 5b) shows a flow diagram illustrated of a surveillance method according to a second embodiment of the present invention.

DETAILED DESCRIPTION OF THE INVENTION

Figure 1:
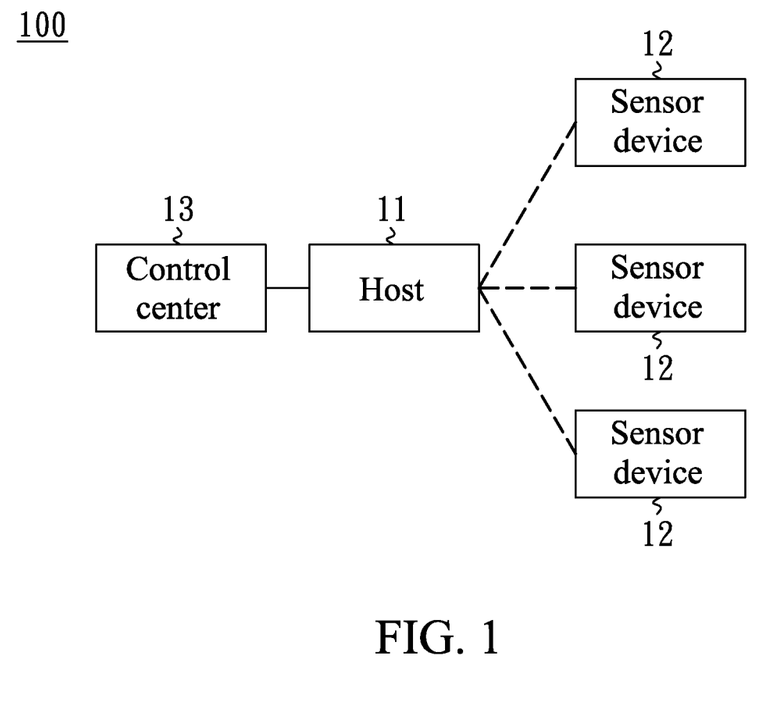
FIG. 1 shows a block diagram illustrated of a surveillance system according to one embodiment of the present invention.

FIG. 1 shows a block diagram illustrated of a surveillance system 100 according to one embodiment of the present invention. The surveillance system 100 primarily includes a host 11 and sensor devices 12. The surveillance system 100 may further include a control center 13, which is connected to the host 11.

According to one aspect of the embodiment, the sensor devices 12 and the host 11 construct a low power wireless sensor network, and are battery-powered. The low power wireless sensor network may, for example, be ZigBee, Z-Wave, 6LoWPAN or DECT ULE. The low power wireless sensor network of the embodiment may be implemented by, but not limited to, IEEE 802.15.4 maintained by Institute of Electrical and Electronics Engineers (IEEE).

Advantages of being powered by batteries include eliminating complexity of power wiring and facilitating relocation of the sensor devices 12 and the host 11. Accordingly, it is flexible to construct, maintain and modify the surveillance system 100.

For reducing power consumption, the sensor devices 12 and the host 11 are awake only in specific time, and are in sleeping state most of the time. In the specification, "most" of the time may mean more than 95% of the time. On the contrary, conventional wireless networks, such as local area wireless networks (Wi-Fi), are powered by mains electricity, and are in active state most of the time.

Figure 2:
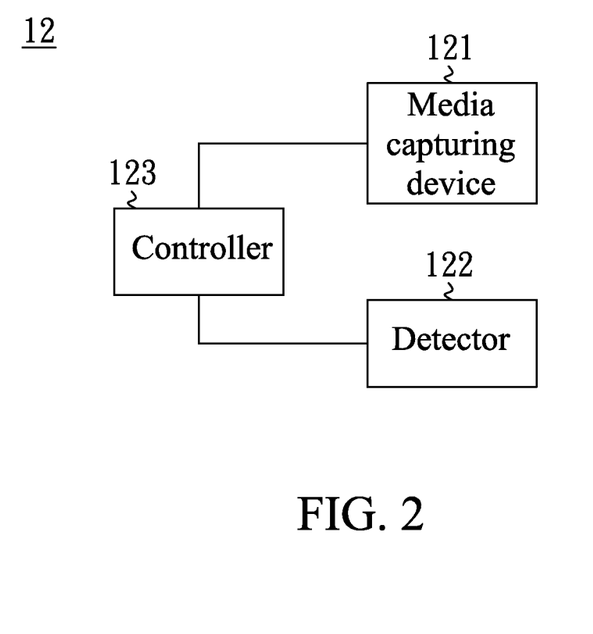
FIG. 2 shows a detailed block diagram of the sensor device of FIG. 1.

In the embodiment, the host 11 may be a gateway, and the control center 13 may be a content management system (CMS). FIG. 2 shows a detailed block diagram of the sensor device 12 of FIG. 1. The sensor device 12 may include a media capturing device 121, a detector 122 and a controller 123. The media capturing device 121 may be a voice capturing device or an image capturing device for capturing voice or image, respectively. In the embodiment, the image capturing device may include a passive infrared (PIR) camera utilized to capture still image or video. The detector 122 of the embodiment may include a motion detector or a door/window detector. The controller 123 receives data or signals from the media capturing device 121 and the detector 122, and accordingly communicates with the host 11. The controller 123 may be implemented by control circuits and/or software.

Figure 3A:
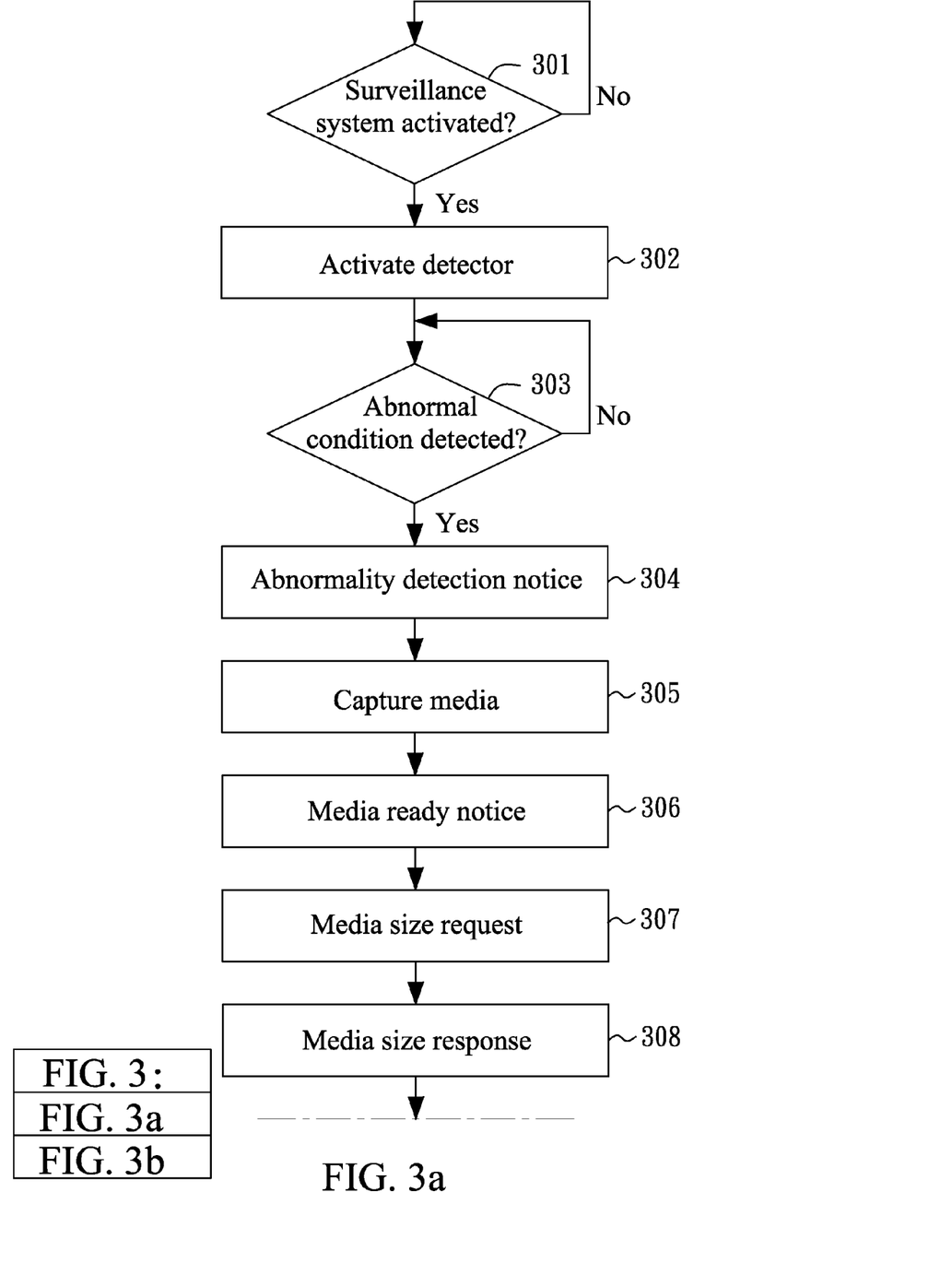
Figure 3B:
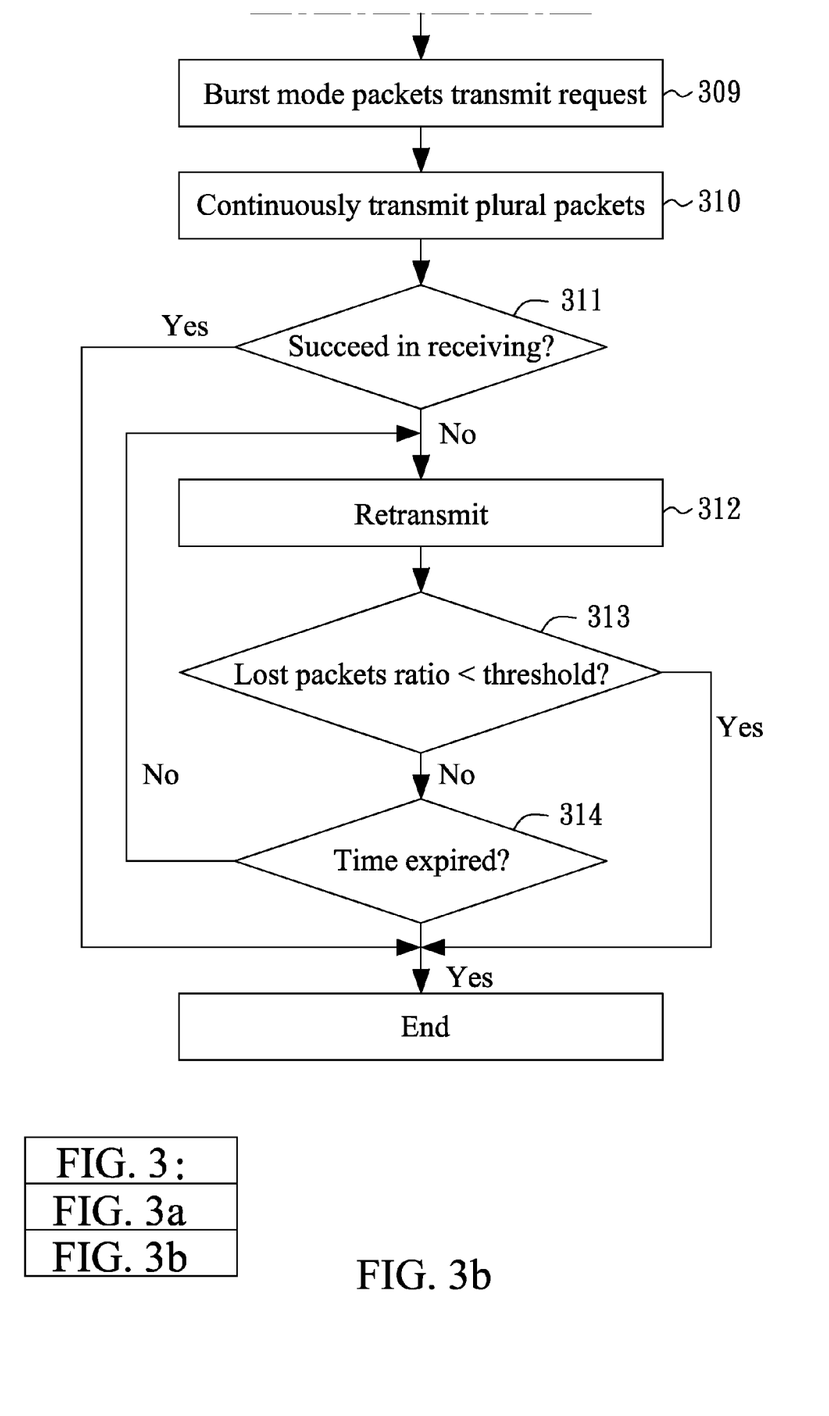
Figure 4:
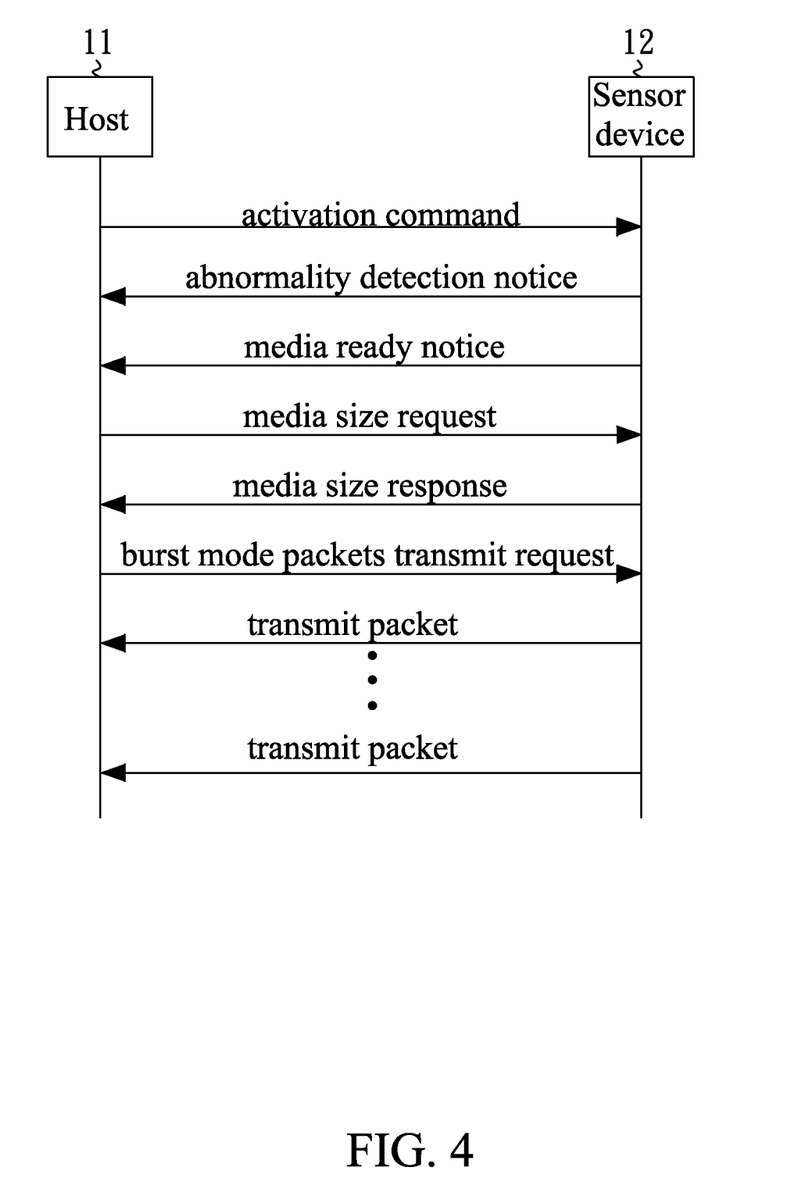
FIG. 4 shows main communication sessions between the host and the sensor device according to the first embodiment.

FIG. 3 shows a flow diagram illustrated of a surveillance method according to a first embodiment of the present invention, and FIG. 4 shows main communication sessions between the host 11 and the sensor device 12 according to the first embodiment.

At first, it is checked in step 301 whether the surveillance system 100 is activated. If yes, the host 11 sends an activation command to the sensor device 12 to activate the detector 122 of the sensor device 12 (step 302). In step 303, if the detector 122 detects an abnormal condition, such as an event triggered by object motion or abnormal door/window open, the controller 123 of the sensor device 12 sends an abnormality detection notice to the host 11 (step 304). The host 11 may further report to the control center 13 after receiving the abnormality detection notice. For example, when a house under surveillance of the surveillance system 100 is intruded by someone who is detected by the motion detector, the controller 123 of the sensor device 12 then sends an abnormality detection notice to the host 11.

Subsequently, in step 305, the media capturing device 121 of the sensor device 12 starts to capture media. For example, the image capturing device of the media capturing device 121 captures at least one still image. When media of required number (or amount) has been captured, the controller 123 of the sensor device 12 sends a media ready notice to the host 11 (step 306).

After receiving the media ready notice, in step 307, the host 11 sends a media size request to the sensor device 12 to request a size of the captured media. Next, the sensor device 12 sends a media size response to the host 11 to notify the host 11 of the size of the captured media (step 308).

In step 309, the host 11 determines a number of packets to be transmitted in burst mode according to the size of the captured media notified by the sensor device 12 in consideration of the entire architecture of the surveillance system 100 (e.g., the number of the sensor devices 12) and/or ambient noise condition, followed by sending a corresponding burst mode packets transmit request to the sensor device 12 (step 309). After receiving the burst mode packets transmit request, the sensor device 12 transmits the determined number of packets in a continuous manner to the host 11 according to the burst mode packets transmit request (step 310).

It is noted that, in the embodiment, the sensor device 12 continuously sends plural packets in burst mode in a communication session, compared with the conventional low power wireless sensor network that transmits only one packet in a communication session. Accordingly, the host 11 and the sensor device 12 of the low power wireless sensor network of the embodiment can substantially reduce power consumption and raise energy efficiency, thereby prolonging battery life time for the host 11 and the sensor device 12. According to another aspect of the embodiment, the burst mode packets transmission between the host 11 and the sensor device 12 is carried out in a communication layer (e.g., application layer) above data link layer (e.g., media access control (MAC) sublayer) of the Open Systems Interconnection (OSI) Model. In other words, the burst mode packets transmission of the embodiment is achieved without modifying data link layer. Accordingly, the host 11 and the sensor device 12 of the low power wireless sensor network of the embodiment are compatible with each other for communication or are device-independent.

After a predetermined period elapses, in step 311, it is checked whether the host 11 succeeds in receiving the continuously transmitted packets. If some packets are lost, the host 11 may request the sensor device 12 to retransmit the lost packets (step 312). After retransmitting packets at least one time, if a ratio of lost packets to total packets is less than a predetermined threshold (step 313), the surveillance flow stops. If the ration is not less than the predetermined threshold and time is not expired (step 314), the flow returns to step 312 to retransmit the lost packets.

Figure 5A:
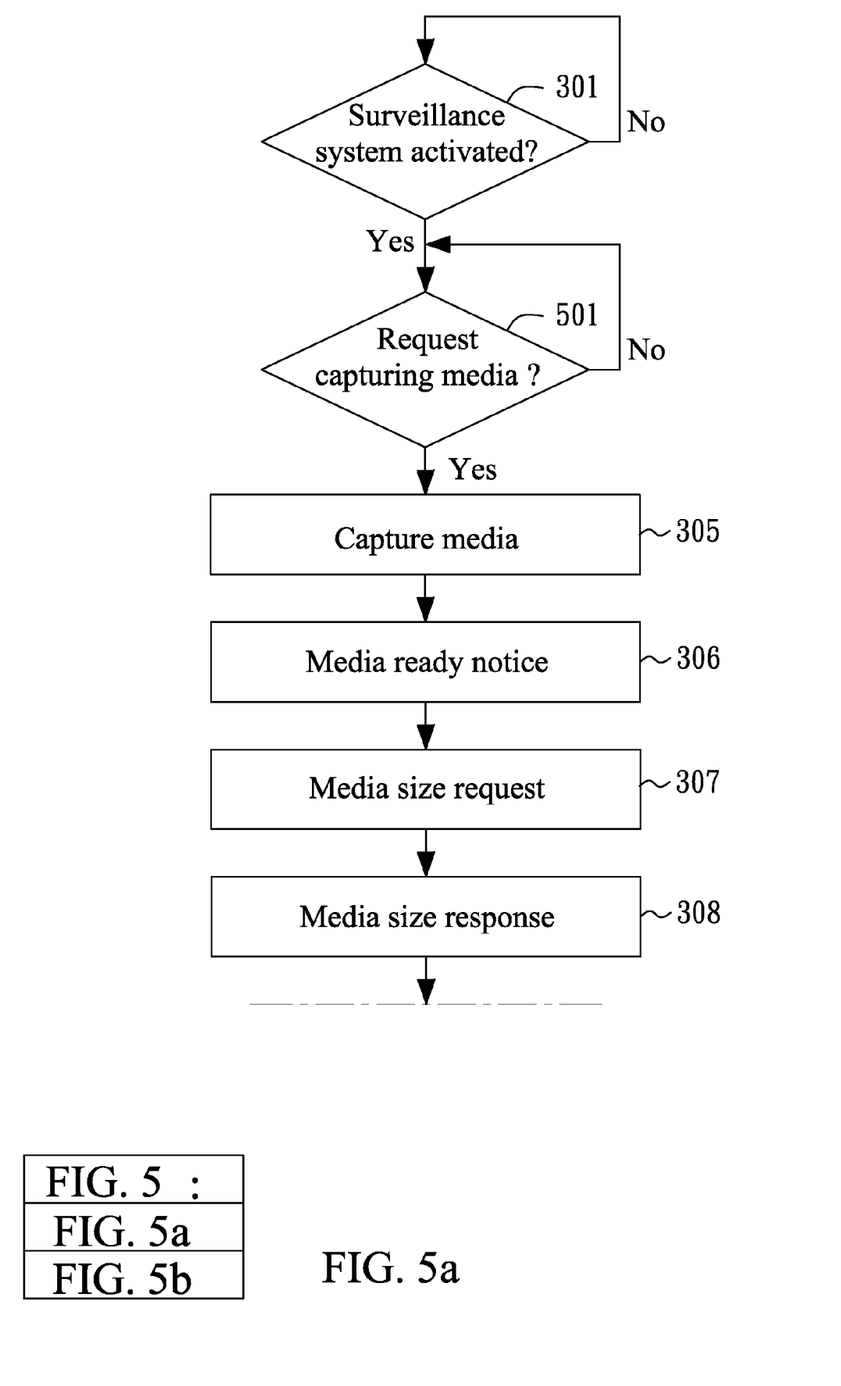
Figure 5B:
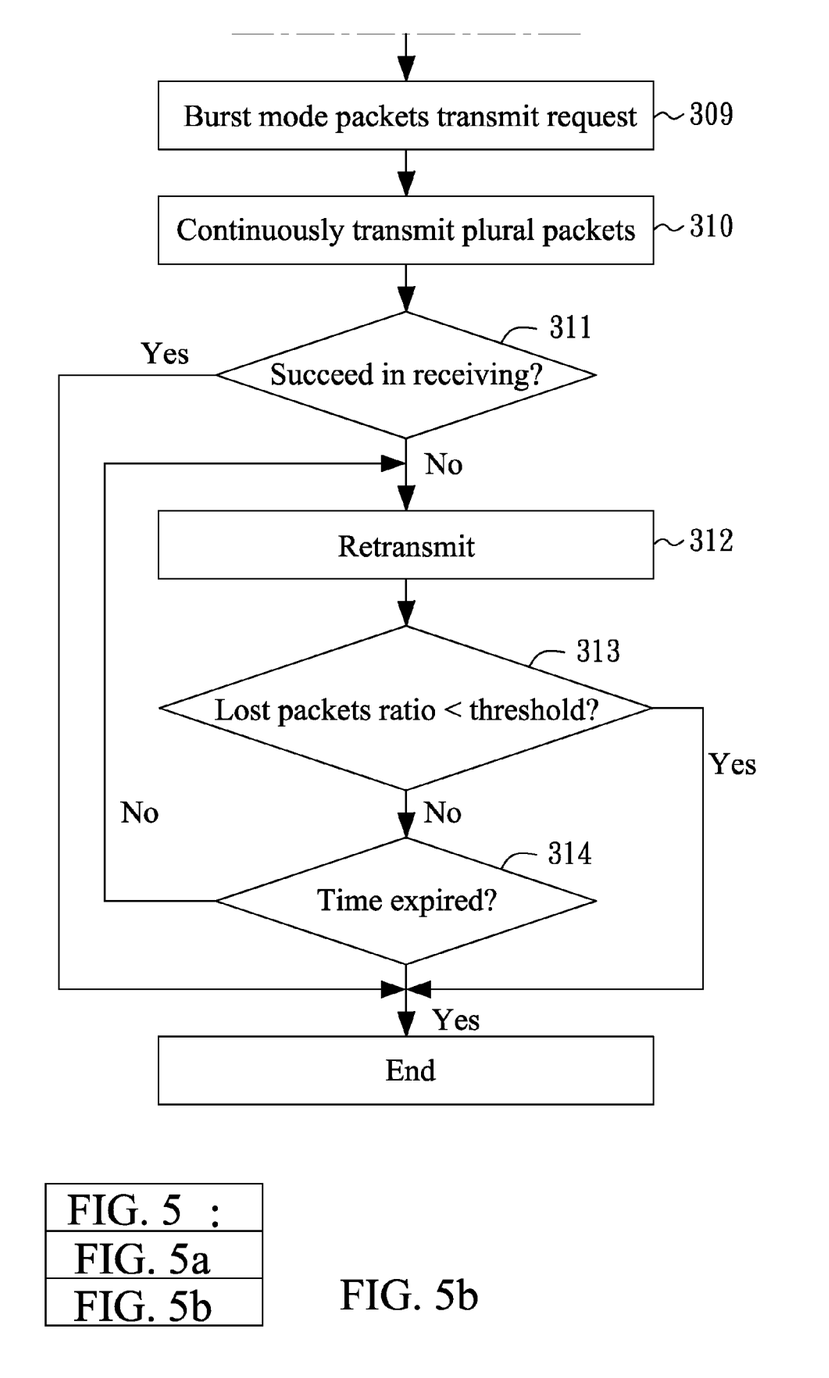
Figure 6:
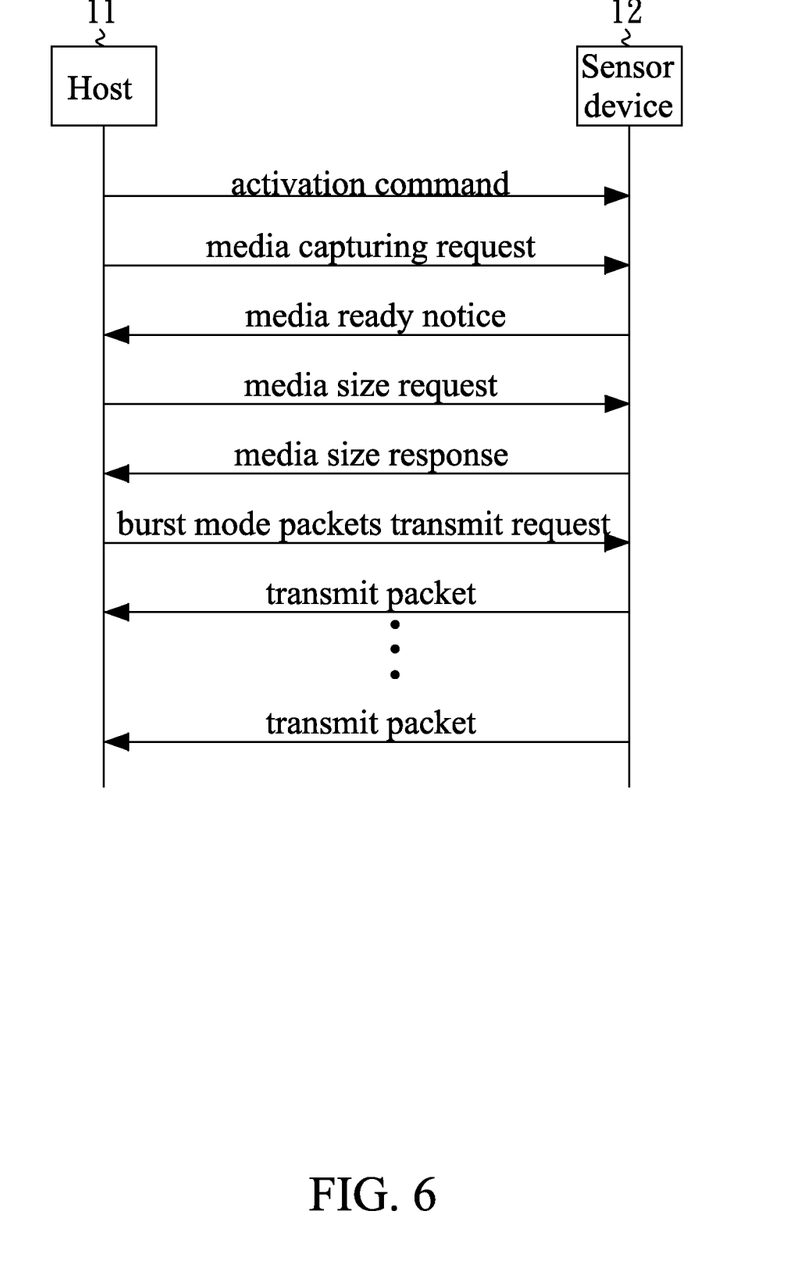
FIG. 6 shows main communication sessions between the host and the sensor device according to the second embodiment.

FIG. 5 shows a flow diagram illustrated of a surveillance method according to a second embodiment of the present invention, and FIG. 6 shows main communication sessions between the host 11 and the sensor device 12 according to the second embodiment.

The second embodiment is similar to the first embodiment with the exception that steps 302-304 of FIG. 3 is replaced with step 501. Specifically, after a user activates the surveillance system 100 (step 301), if the user requests capturing media (e.g., capturing still image or video), the host 11 then sends media capturing request to the sensor device 12 (step 501). For example, when the user is notified of fire report from other system, the user can affirm the fire report by way of checking the captured still image or video. After receiving the media capturing request, the media capturing device 121 of the sensor device 12 then starts to capture media. Other steps of the second embodiment are the same as the first embodiment, and their details are omitted for brevity.

Although specific embodiments have been illustrated and described, it will be appreciated by those skilled in the art that various modifications may be made without departing from the scope of the present invention, which is intended to be limited solely by the appended claims.

What is claimed is:

1. A surveillance method, comprising:
capturing media by a media capturing device of a sensor device according to a trigger event;
sending a media ready notice from the sensor device to a host;
sending a media size request from the host to the sensor device to request a size of captured media;
sending a media size response from the sensor device to the host to notify the host of size of the captured media;
determining a number of packets to be transmitted in burst mode by the host according to notified size of the captured media, followed by sending a corresponding burst mode packets transmit request from the host to the sensor device; and
transmitting the determined number of packets in a continuous manner from the sensor device to the host according to the burst mode packets transmit request.

2. The method of claim 1, wherein the trigger event is caused when a detector of the sensor device detects an abnormal condition.

3. The method of claim 2, wherein the sensor device sends an abnormality detection notice to the host after the detector detects the abnormal condition.

4. The method of claim 3, wherein the host reports to a control center after receiving the abnormality detection notice.

5. The method of claim 2, wherein the detector comprises a motion detector or a door/window detector.

6. The method of claim 1, wherein the trigger event is caused when a user request capturing media and the host sends media capturing request to the sensor device.

7. The method of claim 1, wherein the host and the sensor device construct a low power wireless sensor network.

8. The method of claim 1, wherein the host and the sensor device are battery-powered.

9. The method of claim 1, wherein the sensor device and the host are awake only in specific time, and are in sleeping state most of the time.

10. The method of claim 1, wherein burst mode packets transmission between the host and the sensor device is carried out in a communication layer above data link layer of Open Systems Interconnection (OSI) Model.

11. The method of claim 1, wherein burst mode packets transmission between the host and the sensor device is carried out in a communication layer above media access control (MAC) sublayer of Open Systems Interconnection (OSI) Model.

12. The method of claim 1, wherein burst mode packets transmission between the host and the sensor device is carried out in application layer of Open Systems Interconnection (OSI) Model.

13. The method of claim 1, further comprising:

checking whether the host succeeds in receiving continuously transmitted packets; and the host requesting the sensor device to retransmit lost packets if a ratio of the lost packets to total packets is less than a predetermined threshold.

14. The method of claim 1, wherein the media capturing device comprises a voice capturing device or an image capturing device for capturing voice or image, respectively.

15. The method of claim 14, wherein the image capturing device comprises a passive infrared (PIR) camera.

16. The method of claim 1, further comprising:

sending an activation command from the host to the sensor device to activate a detector of the sensor device.

17. The method of claim 1, wherein the number of packets to be transmitted in burst mode is determined further according to entire architecture of the host and the sensor device, or according to ambient noise condition.

18. The method of claim 1, wherein the host comprises a gateway.

* * * * *